(12) United States Patent
Dendo et al.

(10) Patent No.: US 6,478,359 B2
(45) Date of Patent: Nov. 12, 2002

(54) FOOTREST CLIP AND FOOTREST ASSEMBLY

(75) Inventors: Masahi Dendo, Toyohashi (JP); Kouichi Daigaku, Toyota (JP)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/995,112

(22) Filed: Nov. 27, 2001

(65) Prior Publication Data

US 2002/0063436 A1 May 30, 2002

(30) Foreign Application Priority Data

Nov. 30, 2000 (JP) ....................................... 2000-365531

(51) Int. Cl.⁷ ............................................... B62J 25/00
(52) U.S. Cl. ......................................... 296/75; 180/90.6
(58) Field of Search ............................. 296/75; 180/90.6

(56) References Cited

U.S. PATENT DOCUMENTS

| | | | | |
|---|---|---|---|---|
| 956,681 A | * | 5/1910 | Clarke | 296/75 |
| 2,654,420 A | * | 10/1953 | Rogers | 296/75 |
| 2,862,761 A | * | 12/1958 | Scheidegger | 296/75 |
| 4,310,193 A | * | 1/1982 | Kolleas | 296/75 |
| 5,183,308 A | * | 2/1993 | Koga et al. | 296/75 |
| 6,073,515 A | * | 6/2000 | Elton et al. | 296/75 |
| 6,220,643 B1 | * | 4/2001 | Kato | 296/75 |

FOREIGN PATENT DOCUMENTS

| | | |
|---|---|---|
| EP | 0215561 | 5/1986 |
| EP | 0590993 | 9/1993 |
| GB | 2344569 | 7/1999 |
| JP | 10305747 | 5/1997 |
| JP | 11247822 | 3/1998 |

* cited by examiner

*Primary Examiner*—D. Glenn Dayoan
*Assistant Examiner*—Lori L Coletta
(74) *Attorney, Agent, or Firm*—Edward D. Murphy

(57) ABSTRACT

A footrest assembly (15) comprises a footrest (17) and a clip (18). The clip (18) has a shank (27) to be inserted into and fixed to a hollow tubular support (22, 23) extending from a rear surface (21) of a step of the footrest (17), and a resilient engagement pawl (29), which serves as a vehicle body panel fixing portion, formed in a shank portion from protruded from the end of the support. A protrusion (33) for defining the height of the footrest is provided at the intermediate region of the side surface of the shank (27) of the clip (18), and is arranged to engage with an end face of a notch (26) formed at the end of the support so as to prevent the shank from being further inserted. The protrusion (33) is formed at the side surface of the shank of predetermined strength which allows the protrusion to be shorn by the end of the support when a vehicle collision of a predetermined impact force causes the shank to be pressed to the support of the footrest. In the above manner, even if the vehicle body panel is deformed toward the step of the footrest, the thrust directed to the foot of a car driver or occupant in the step will be minimal.

10 Claims, 9 Drawing Sheets

PRIOR ART   FIG.1
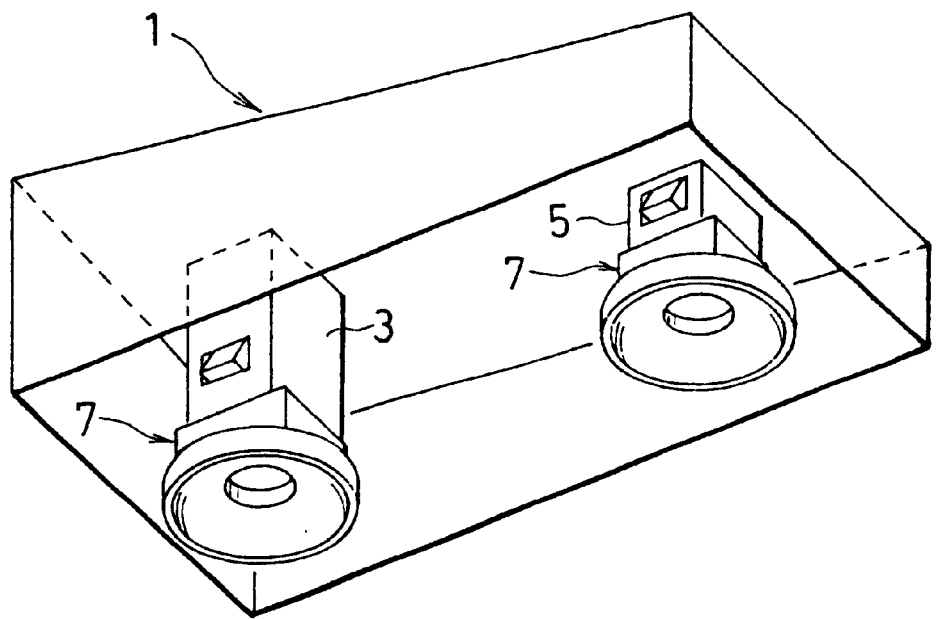
PRIOR ART   FIG.2
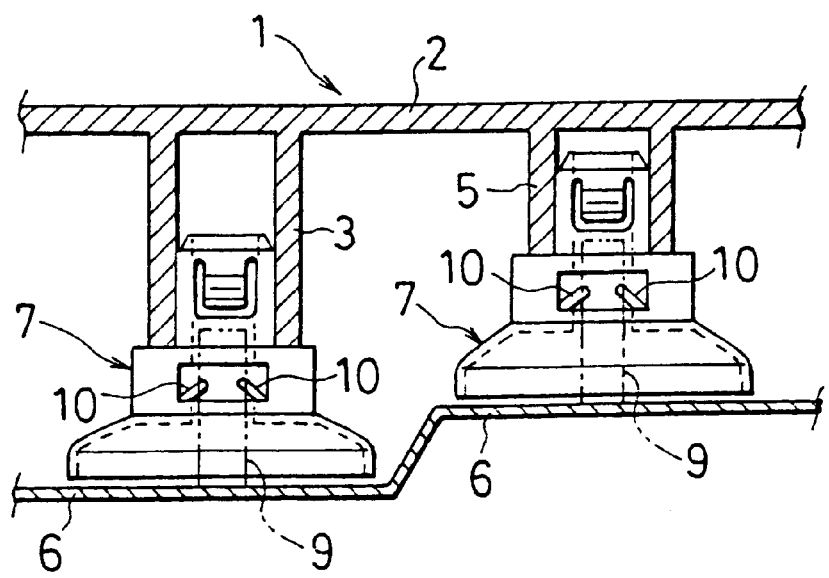

PRIOR ART FIG.3
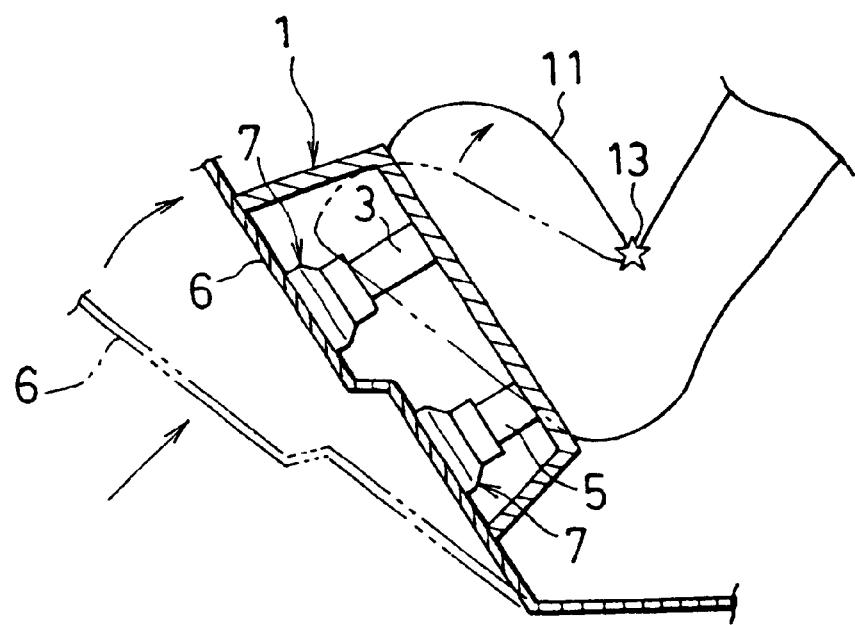

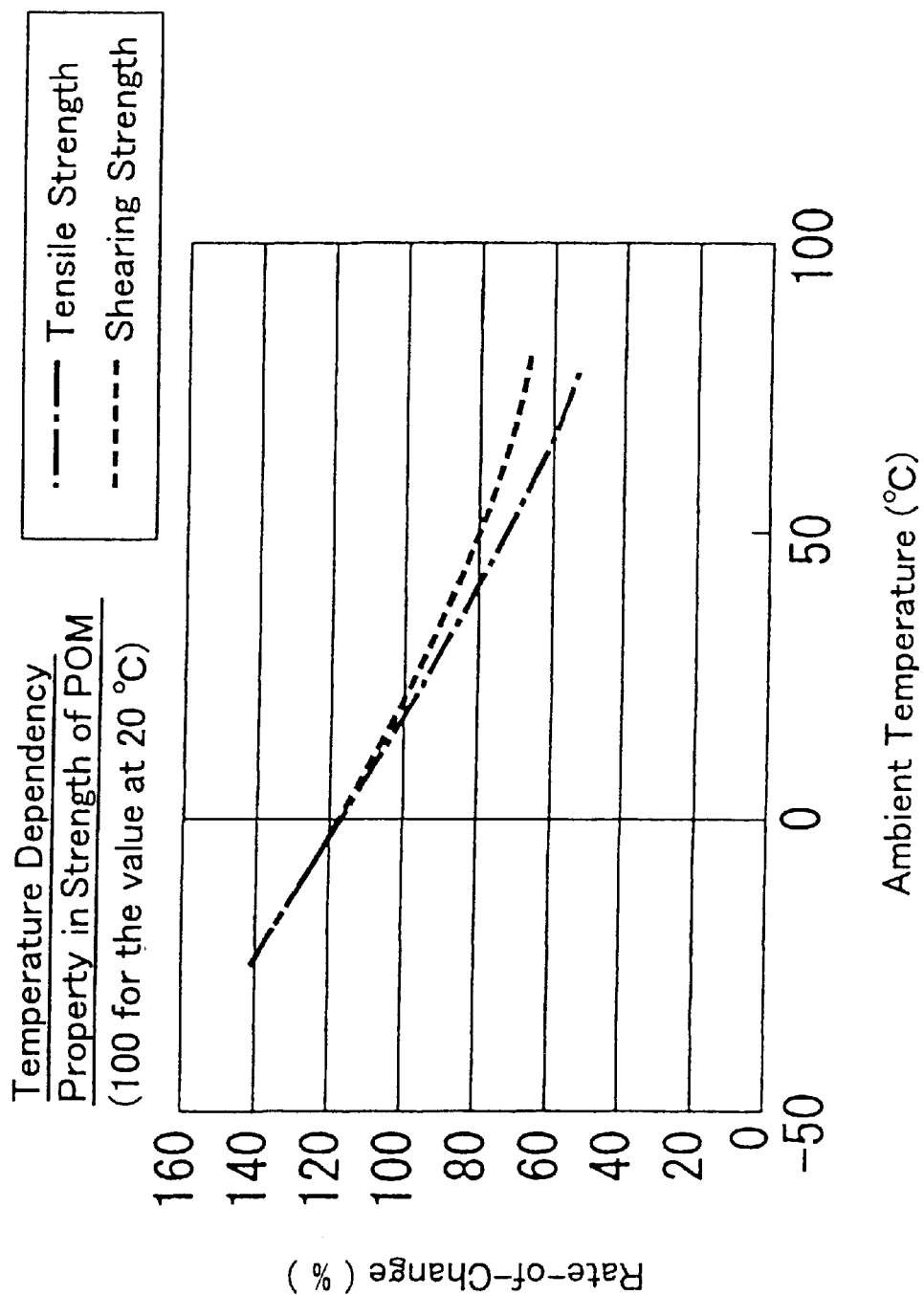

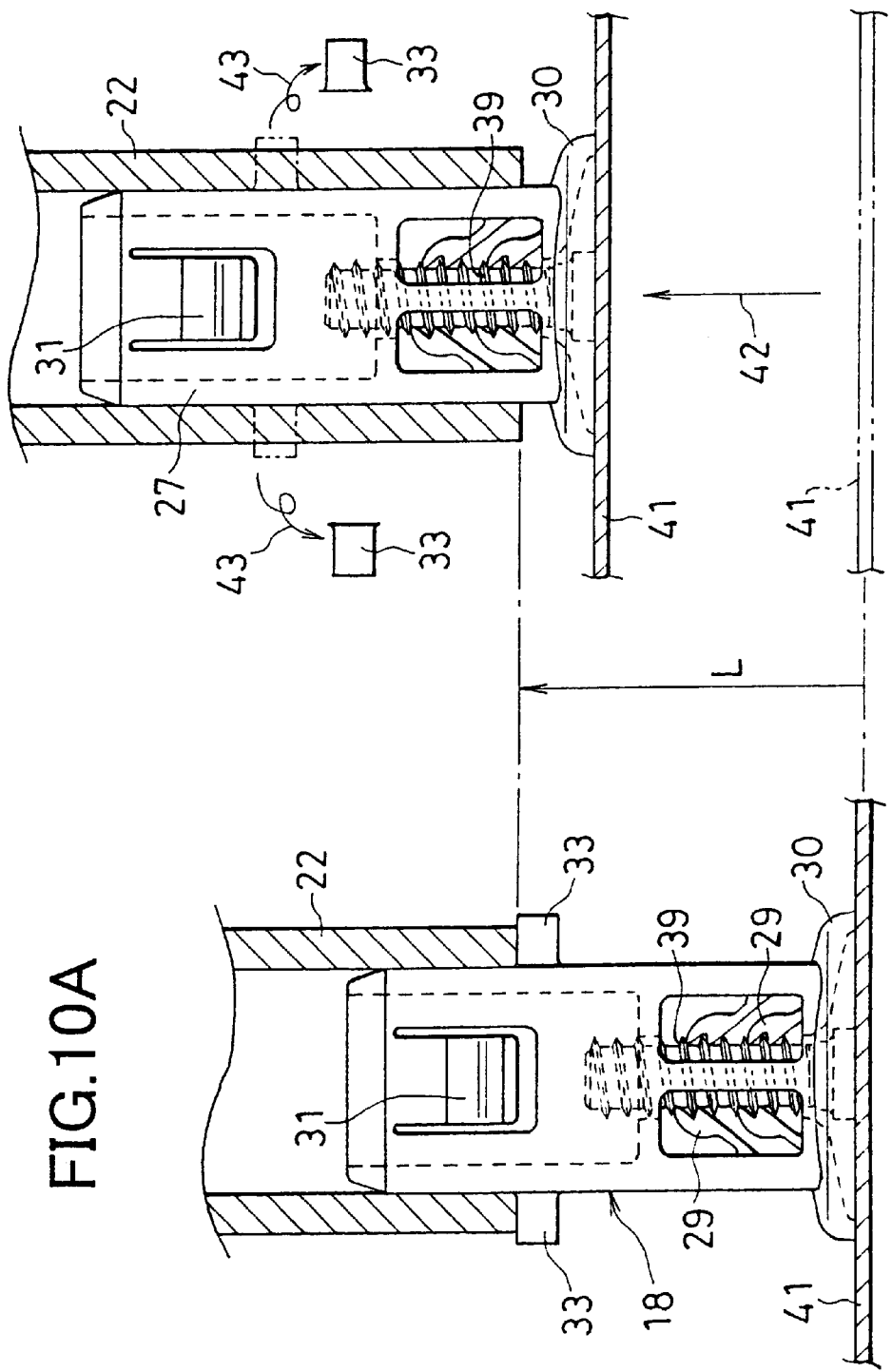

FOOTREST CLIP AND FOOTREST ASSEMBLY

BACKGROUND OF THE INVENTION

The present invention relates to a footrest clip for mounting a footrest on a vehicle body panel, which includes a shank to be inserted into and fixed on a hollow support extending from a rear surface of a step of the footrest and a vehicle body panel fixing portion formed in a region of the shank to be protruded out of the end of the support. The present invention also relates to a footrest assembly for mounting a footrest on a vehicle body panel using the clip.

A footrest is mounted on a vehicle body panel in order to support the foot of a car driver or occupant. Clips having the same configurations can be used for mounting a footrest to a vehicle body panel, even if a plurality of hollow supports extending from the rear surface of the footrest have different lengths, respectively. A clip may have further improvements to facilitate the detaching operation of the footrest. These conventional footrests to be mounted on vehicle body panels will be described with reference to FIGS. 1 to 3 as attached hereto. In FIGS. 1 and 2, a footrest 1 is formed with hollow tubular supports 3 and 5, each extending from a rear surface of a step 2 of the footrest 1 toward a vehicle body panel 6 (FIG. 3). As shown in FIG. 3, the footrest 1 is inclined to allow the foot of the car driver to be placed thereon comfortably, and thereby the support 3 and the support 5 have different lengths from each other. Clips 7 are inserted into and fixed to the supports 3 and 5, respectively. Even if the lengths of the supports 3 and 5 are different from each other, the clips 7 are formed in the same size and configuration. The footrest 1 is mounted on the vehicle body panel 6 as illustrated in FIG. 2 with attaching the clips 7 to the supports 3 and 5 as shown in FIG. 1. The vehicle body panel 6 is provided with rod-shaped studs 9 each having a thread or peripheral grooves in the side surface thereof and standing vertically on the vehicle body panel. The footrest 1 is positioned to allow each of the studs 9 to be received by the corresponding clip 7, and then the footrest is pushed to the studs. The resilient engagement pawl 10 is formed on each hollow shank of the clips to be engaged with the thread or the peripheral groove of the received stud 9, and thereby the footrest 1 can be mounted to the vehicle body panel only by the positioning and pushing operations.

FIG. 3 shows a state when the vehicle body panel 6 is deformed from the position of the double-dot chain line (or phantom line) to the position of the solid line by a collision or other causes. Due to this deformation, the footrest 1 mounted on the vehicle body panel 6 forces the foot 11 of the driver to move from the position of the double-dot chain line to the position of the solid line position. Thus, the force might be concentrated at a point 13 of the driver's foot to damage the foot 11. The prior art has designed a footrest assembly that even if a vehicle body panel is deformed by a collision or the like, the footrest minimizes the height of the resulting thrust which is pressed against the foot of a driver so as to prevent the driver from being damaged. In this prior art footrest assembly, a stud is directly inserted into a hollow support without using a clip, and when the vehicle body panel is deformed by a collision or other factor, the stud is pressed and further inserted into the support to prevent the footrest from being thrusted. In this footrest assembly, no clip is used. Thus, if the stud is pressed and further inserted into the support of the footrest, the support will be broken, resulting in no possibility of the reuse of the footrest. In addition, although the thrusting of the footrest is prevented because the pressed stud is further inserted into the support, it is required for control of the footrest thrusting according to an amount of the pressing load to consider a plurality of factors, such as tensile strength and friction coefficient in the material of the support and the shape of the hole of the support. Thus, it is difficult to form a suitable support.

There are other prior art protective devices that protect other parts of the body, for example, the head of an occupant in a rear seat. In this type of device, the leg extending toward a mounting hole of a vehicle body panel is integrally formed at a rear surface of an interior trim and has a plurality of protrusions in an axial direction. If an excessive impact force or the like is applied to the leg, the protrusions can be broken to absorb shock so as to assure safety of occupants. That also uses no clip. Thus, when the leg of the interior trim is broken, it is required to replace the entire interior trim, resulting in no possibility of the reuse of the interior part. Further, since that device is not directed to a footrest, any suggestion on elimination of the influence of the deformation from the vehicle body panel is not included.

SUMMARY OF THE PRESENT INVENTION

It is therefore an object of the present invention to provide a footrest clip and a footrest assembly capable of relieving shock to the foot of a car driver or occupant in the event of a vehicle collision, of allowing a footrest to be reused even if an associated vehicle body panel has any deformation due to the vehicle collision, and of dealing with a collision force causing the deformation of the panel in an adequate manner to prevent the footrest from being thrust up.

In order to achieve the above object, according to the present invention, there is provided a footrest clip for mounting a footrest on a vehicle body panel, the footrest clip including a shank to be inserted into and fixed to a hollow tubular support extending from a rear surface of a step of the footrest, and a vehicle body panel fixing portion formed at a portion of the shank which is protruded out of the end of the support. The footrest clip is characterized in that a protrusion for defining the height of the footrest is provided at the side of the intermediate height region of the shank and is arranged to engage with the end of the support so as to prevent the shank from being further inserted; and the protrusion is formed on the side of the shank with such a strength that allows the protrusion to be shorn by the end of the support when a vehicle collision or the like provides an excessive impact force to make the shank further press to the support of the footrest, whereby even if the vehicle body panel is deformed toward the step of the footrest, the thrust applied to the step and directed to the foot of a car driver can be eliminated or minimized. Thus, the shock to the foot of the driver or occupant in the event of a vehicle collision can be relieved, and the footrest can be reused even if the vehicle body panel is deformed due to the collision. In addition, the collision force causing the deformation of the panel can be adequately dealt only by controlling or presetting the shearing load of the protrusion.

In the above clip, it is preferable that the shank includes an resilient engagement portion to be engaged with an engagement hole of the support when inserted into the support so as to prevent the shank from falling down from the support. Further, the resilient engagement portion may have a resilience allowing the resilient engagement portion to get out of the engagement hole of the support when the above excessive impact force is applied to the shank.

Preferably, the shank portion protruded from the end of the support is hollowed to receive a rod-shaped stud which stands on the vehicle body panel and has a side surface formed with a thread or peripheral grooves, wherein the vehicle body panel fixing portion includes a resilient engagement pawl to be engaged with the thread or peripheral groove of the stud received by the hollowed shank portion. Alternatively, the vehicle body panel fixing portion may be an anchoring-leg engagement portion to be inserted into and engaged with a mounting hole formed in the vehicle body panel.

Further, according to the present invention, there is provided a footrest assembly including a footrest and a clip for mounting the footrest on a vehicle body panel, wherein a shank of the clip is inserted into and fixed to a hollow tubular support extending from a rear surface of a step of the footrest, and the clip is provided with a vehicle body panel fixing portion formed in a region of the shank protruded out of the end of the support. The footrest assembly is characterized in that the clip comprises a protrusion for defining the height of the footrest, which is provided at the side of the intermediate height region of the shank and is arranged to engage with the end of the support so as to prevent the shank from being further inserted; and the protrusion is formed on the side of the shank with such a strength that allows the protrusion to be shorn by the end of the support when a vehicle collision or the like provides an excessive impact force to make the shank further press to the support of the footrest, whereby even if the vehicle body panel is deformed toward the step of the footrest, the thrust applied to the step and directed to the foot of a car driver can be eliminated or minimized. Thus, in the event of a vehicle collision, the shock to the foot of the driver or occupant can be relieved, and the footrest can be reused even if the vehicle body panel is deformed due to the collision. In addition, the collision force causing the deformation of the panel can be adequately dealt only by controlling or presetting the shearing load of the protrusion.

In the above footrest assembly, it is preferable that the support of the footrest is formed with an engagement hole in a region of the support into which the shank of the clip is received, and the shank of the clip is formed with a resilient engagement portion to be engaged with the engagement hole in a shank region inserted into the support. In this assembly, it is preferable that the resilient engagement portion and the engagement hole of the support are formed in a configuration allowing the resilient engagement portion to get out of the engagement hole of the support when the above excessive impact force is applied to the shank. The vehicle body panel may be provided with a rod-shaped stud which stands thereon and has a side surface formed with a thread or peripheral grooves, wherein the shank of the clip is hollowed to receive the stud, and the vehicle body panel fixing portion includes a resilient engagement pawl to be engaged with the thread or peripheral groove of the stud received by the hollow shank. Further, the vehicle body panel may be formed with a mounting hole, and the vehicle body panel fixing portion of the clip may include an anchoring-leg engagement portion to be inserted into and engaged with the mounting hole.

BRIEF DESCRIPTION OF THE ACCOMPANYING DRAWINGS

FIG. 1 is a perspective view seen from a rear surface of a step of a conventional footrest assembly.

FIG. 2 is a sectional view showing a state when the footrest assembly of FIG. 1 is mounted on a vehicle body panel.

FIG. 3 is an explanatory view how a stress is applied onto the foot in the footrest assembly of FIG. 1 when the vehicle body panel is deformed.

FIG. 9 is a graph showing the temperature dependency property in the strength of POM (polyoxymethylene), where each rate-of-change to ambient temperature (° C.) of the tensile strength (the single-dot chain line) and the shearing strength (the broken line) is indicated with the premise that the value at 20° C. is set to value 100.

FIGS. 10(A) and (B) are explanatory views wherein a footrest assembly according to the present invention is mounted on the vehicle body panel; FIG. 10(A) showing a normal state when a vehicle body panel is not deformed, and FIG. 10(B) showing a deformed state after the vehicle body panel is deformed.

Figure 11A:
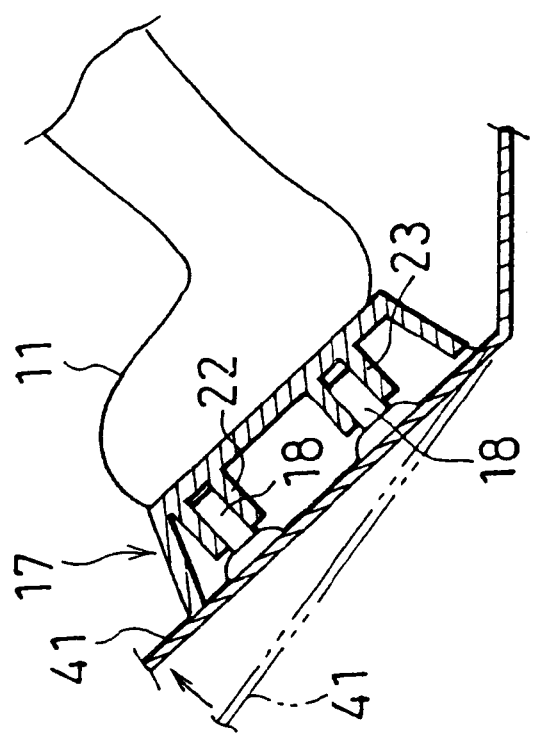
Figure 11B:
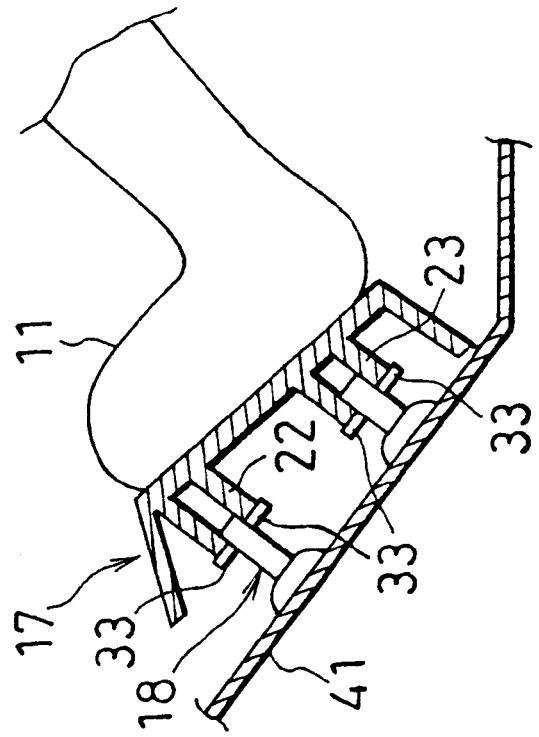

FIGS. 11(A) and (B) are views showing a relationship between a footrest assembly of the present invention and the foot, wherein FIG. 11(A) is an explanatory view showing a normal state when a vehicle body panel is not deformed and FIG. 11(B) is an explanatory view showing a state when the vehicle body panel is deformed.

Figure 12:
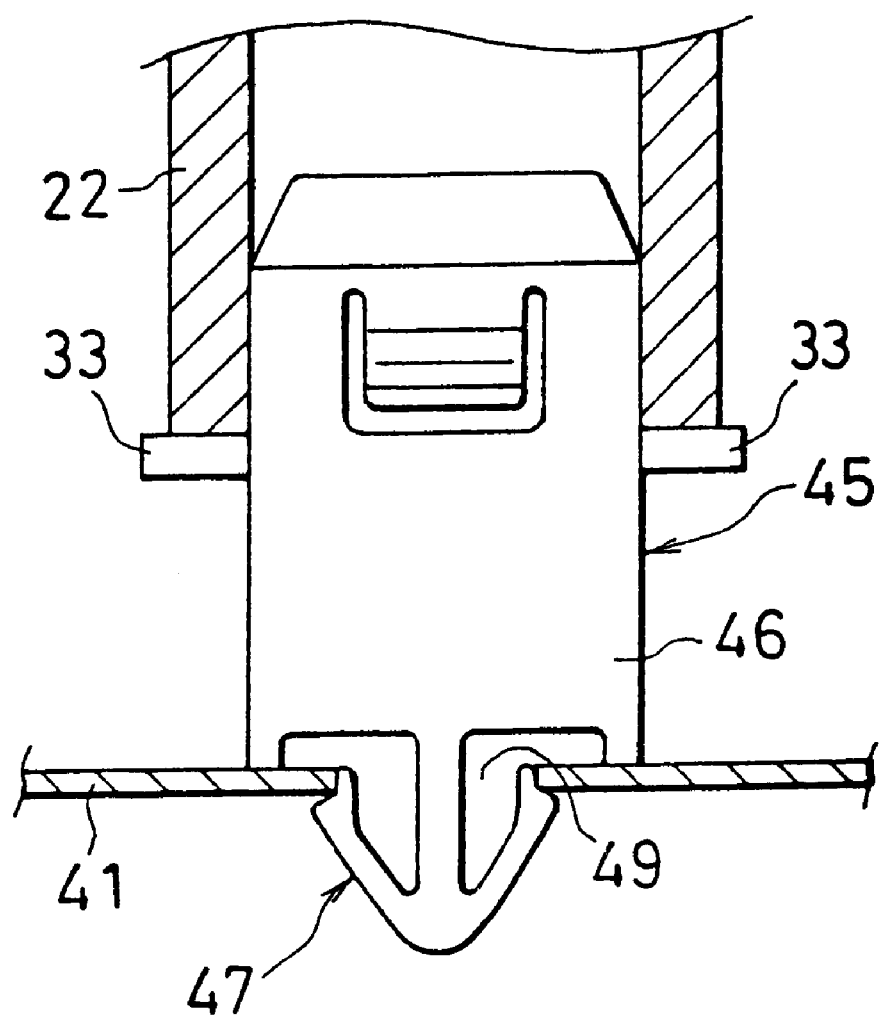

FIG. 12 is a view showing a modified embodiment of the clip according to the present invention in which the clip is mounted on the panel.

DETAILED DESCRIPTION OF THE PREFERRED EMBODIMENT

Figure 4:
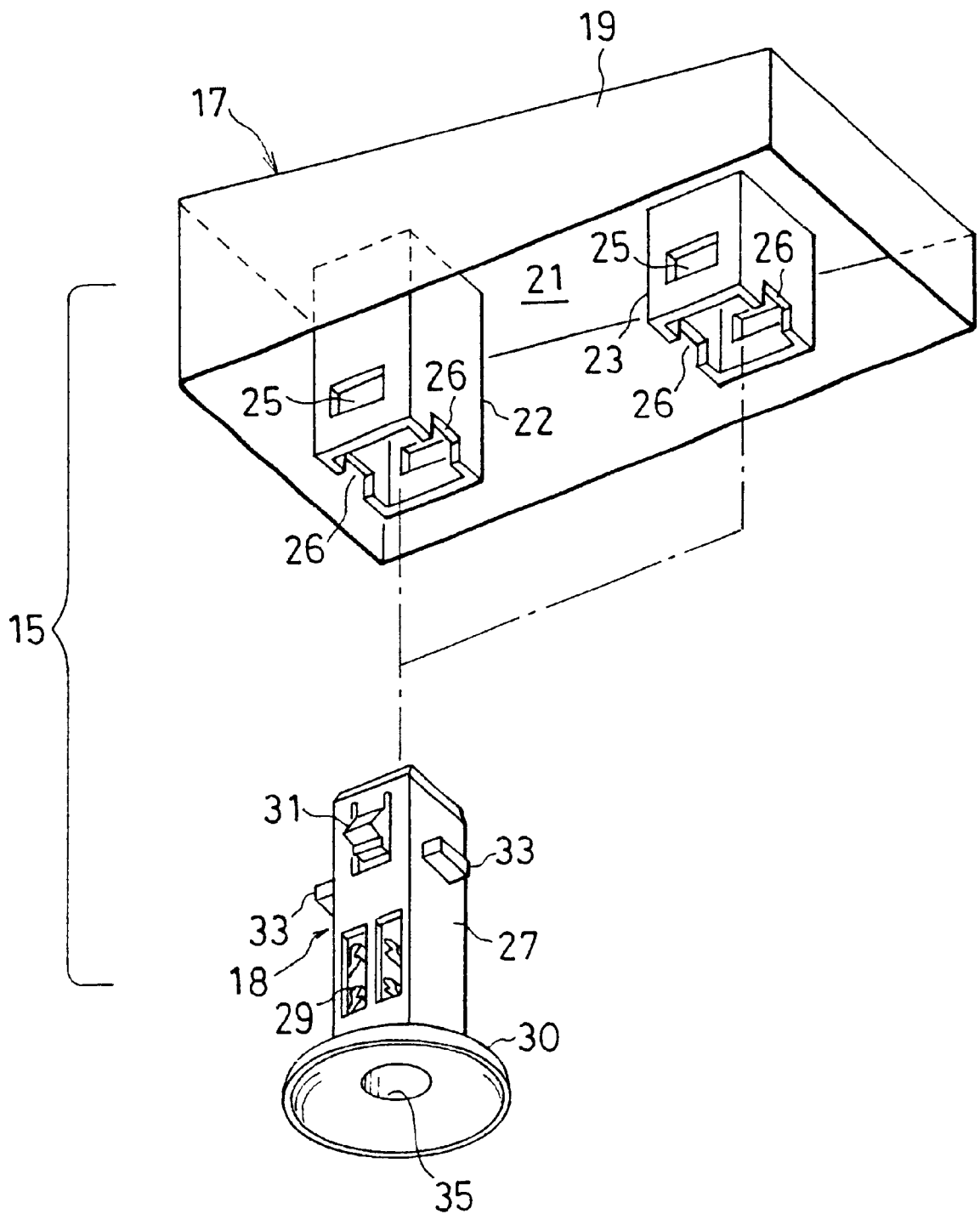
FIG. 4 is a perspective view seen from a rear surface of a step of a footrest before assembling a footrest assembly according to an embodiment of the present invention.

With reference to the drawings, embodiments of the present invention will now be described. FIG. 4 shows an overview of a footrest assembly 15 according to one embodiment of the present invention. The footrest assembly 15 comprises a footrest 17 and a clip 18. The footrest 17 and the clip 18 are individually formed of a one piece member from an integrally molded product made of plastic material, respectively.

In FIG. 4, the footrest 17 is substantially the same as the conventional footrest 1 shown in FIG. 1. The footrest 17 includes a box-shaped main body 19 having an inclined step allowing the foot of a driver or an occupant of a vehicle to be placed thereon. A pair of hollow rectangular-tubular supports 22 and 23 having different lengths are formed on a rear surface 21 of the step of the main body 19 to extend toward a vehicle body panel on which the footrest is mounted. The clips 18 are inserted into and fixed to the supports 22 and 23, respectively. An engagement hole 25 is formed in each of the supports 22 and 23 to fix the inserted clips 18. Further, a rectangular notch 26 is formed in each end of the supports 22 and 23 to receive a corresponding protrusion (described later) of the clip 18 for defining (or determining) the height of the footrest. In the illustrated embodiment, each of the supports 22 and 23 is formed in a rectangular tube in conformity with the configuration of the clip 18 to be inserted therein. When each of the support has the rectangular-tube shape, the orientations of the clip and the support about their axes can be advantageously defined. In case of forming the clip 18 in a cylindrical shape, each of the supports can be preferably formed in a cylindrical shape.

Figure 5:
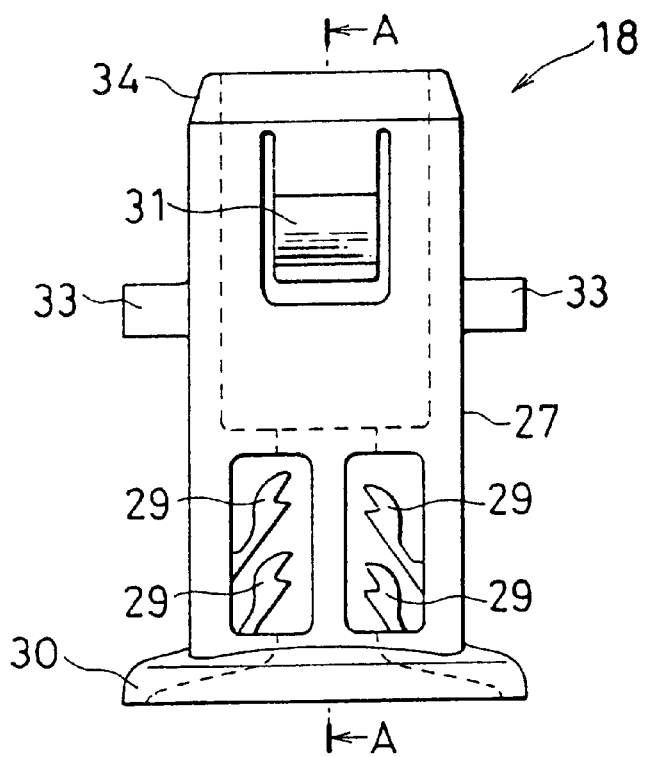
FIG. 5 is a front view of a footrest clip according to an embodiment of the present invention.
Figure 6:
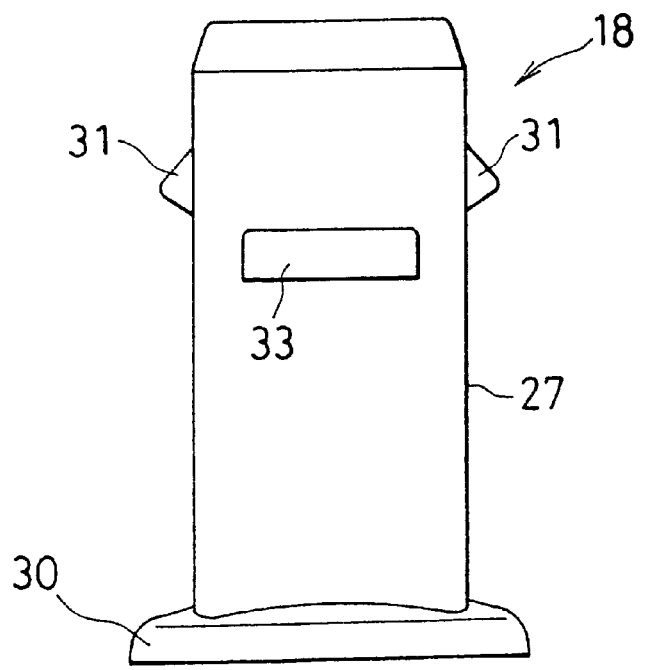
FIG. 6 is a right side view of the clip of FIG. 5.

The clips 18 are formed in the same size and configuration thereof to be applicable for any of the supports 22 and 23 having different lengths. The detail of such a clip 18 will be described with reference to FIG. 4 and FIGS. 5 to 8. The clip 18 is provided for mounting the footrest 17 on the vehicle body panel, and has a shank 27 to be inserted into and fixed to the hollow tubular supports 22 and 23. The shank 27 is formed in a hollow rectangular-tubular shape to receive a rod-shaped stud, shown only in FIGS. 10A and 10B, which stands vertically on the vehicle body panel and has a thread or peripheral grooves. As described above, while the shank may be formed in a cylindrical shape, it is preferably to have the rectangular-tubular shape in view of the orientation (or direction) with respect to the supports 22, 23. A resilient engagement pawl 29, which serves as a fixing portion to be fixed to the stud standing on the vehicle body panel, is provided inside a region of one end of the shaft 27 (lower end in FIGS. 4 and other). As best shown in FIG. 5, the engagement pawl is preferably formed in vertical two-stage arrangement and in a pair opposed to each other. Further, if the stud has a thread formed thereon, respective heights of the paired engagement pawls are preferably shifted by the half pitch of the thread. This can provide highly maintained engagement force to the threaded stud. In order to allow the insertion of the stud but prevent the coming-off of the stud, each of the engagement pawls 29 extends inwardly and toward the other end (the upper end in FIGS. 4 and other), and has a resiliency which allows the engagement pawl to be bent outward when the stud is inserted and to move back inward after inserted. A flange 30 having a tapered configuration extending outward is formed in the region of the one end (lower end) of the shank 27 to allow the clip 18 to be seated stably on the vehicle body panel and to facilitate an operation of finding the tip of the stud. Further, the shank 27 is provided with a pair of resilient engagement portions 31 to be engaged with the engagement holes 25 of the support 22, 23 to prevent the shank from falling down from the support when the shank is inserted into the support. By inserting the shank 27 of the clip into the support 22 (or 23) to meet the resilient engagement portion 31 with the engagement hole 25, this resilient engagement portion 31 is engaged with the hole 25 and thereby the clip 18 is fixed to the support 22 (or 23) as it is. Preferably, the resilient engagement portion 31 has a resilience which allows the engagement to be relieved by pulling the clip 18 with a relatively strong pull so as to take the clip 18 out of the support.

In the present invention, a pair of protrusions 33 for defining the height of the footrest, which are engaged with the end of the support 22 (or 23) to keep the shank from being further inserted, are provided in the intermediate height of the side surface of the shank 27 of the clip 18. As shown in FIG. 4, each of the protrusion 33 is received in the notch 26 formed in the end of the engagement portion. The vertical position of the protrusion 33 is arranged at a position where the resilient engagement portion 31 is fitted and engaged with the corresponding engagement hole 25 of each of the engagement portion when the protrusion 33 is contacted with the end face of the notch 26. The protrusions 33 are preferably, but not necessarily, paired in the direction orthogonal to the pair of the resilient engagement pawls 29. In the present invention, each of the protrusions 33 is formed on the side surface of the shank with a strength which allows each of the protrusions to be shorn by the end face of the corresponding notch 26 of the support 22 (or 23) when an excessive impact force leading (or 25 causing) the deformation of the vehicle body panel by a vehicle collision or other factor is applied and thereby a strong force pressing the shank 27 into the support 22 (or 23) is applied. As described above, each of the protrusions 33 is formed on the shank 27 with the strength allowing each of the protrusions to be broken by a certain strong shearing force. Thus, when the protrusions 33 are broken by the certain strong shearing force to be separated from the shank 27, the shank 27 of the clip 18 is inserted further into the support 22, 23, and thereby the height between the footrest 17 and the vehicle body panel is reduced. This make it possible to eliminate or minimize the thrust directed to the foot of the driver or occupant on the step even if the vehicle body panel is deformed toward the step of the footrest. The resilient engagement portion 31 has a resilience allowing the resilient engagement portion to get out of the support engagement hole 25 when the above excessive impact force is applied to the shank. Further, by choosing a material having a lower temperature dependency property in the shearing strength than that in the tensile strength, the variation in breaking strength depending on ambient temperature and can be reduced to a lower value than that used in the pressing and inserting process needed to assemble the footrest assembly 15. The material typically includes POM (polyoxymethylene : acetal resin or the like). FIG. 9 is a graph showing the temperature dependency property in the strength of POM, where the tensile strength is indicated by the single-dot chain line, the shearing strength being indicated by the broken line, the horizontal indicating ambient temperature (degrees centigrade =° C.), the vertical axis indicating the rate-of-change of each of the strengths, and each of the rate-of-changes being indicated with the premise that the value at 20° C. is 100. In that material, the fall in the rate-of-change of the shearing strength becomes lower than that of the tensile strength as ambient temperature increases. This proves that that material is suitable for the clip of the present invention.

Figure 7:
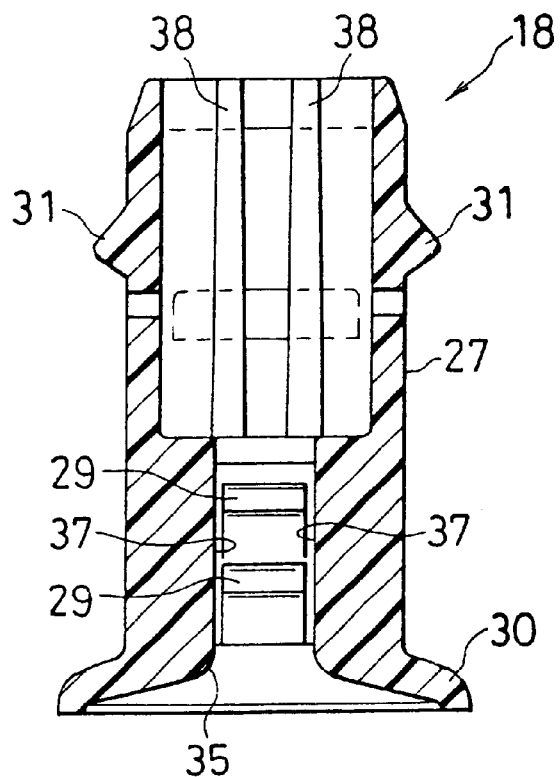
FIG. 7 is a sectional view of the clip taken along the line A—A of FIG. 5.
Figure 8:
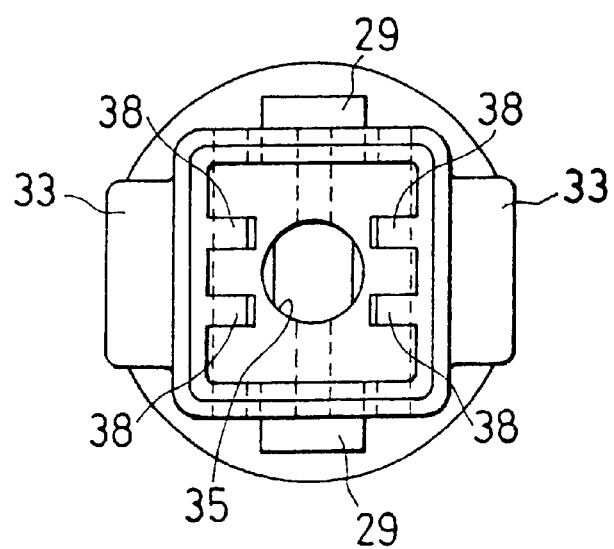
FIG. 8 is a plan view of the clip of FIG. 5.

In the clip 18, the insertion end 34 (upper end in FIG. 5) of the shank 27 is preferably tapered to facilitate the insertion to the support 22, 23 of the footrest. Preferably, a circular hole 35 slightly larger than the outer diameter of the stud is formed in the flange 30 of the clip 18, in order to receive and centers the stud standing vertically on the vehicle body panel. Preferably, a rib-shaped guide 37 extending axially and protruding inward is provided in the region formed with the engagement pawl 29 of the shank 27, in order to prevent the stagger of the received stud. In FIG. 7, a region of the shank on the upper side than the guide 37 receiving the stud is preferably formed in a large hollow configuration for the purpose of saving material and reducing weight. If the strength is not sufficient, a reinforcing rib 38 extending axially inward may be provided as shown in FIGS. 7 and 8, and the number and configuration of the rib may be determined according to need.

As an operation for mounting the footrest 17 to the vehicle body panel, the clips 18 are inserted into and fixed to the supports 22 and 23 of the footrest 18, respectively. In this attaching operation, the resilient engagement portion 31 is fitted into the engagement hole 25 of the support by inserting the shank 27 of the clip 18 to bring the protrusion 33 into contact with the end face of the notch 26 of the support, and thereby the clip 18 is fixed to the support 22, 23. On the other hand, corresponding to the supports 22 and 23, two rod-shaped studs each having a side surface formed with a thread or peripheral grooves (threaded studs in this embodiment) are fixedly attached on the vehicle body panel by welding or the like. In order to mount the footrest 17 on the vehicle body panel, the box-shaped footrest 17 is held and placed on the threaded studs of the vehicle body panel, and is then pushed and fixed thereto. More specifically, the corresponding end of the threaded stud is caught by the flange 30 at the end of the clip 18, and then, the footrest is gradually pushed to lead the tip of the threaded stud into the center hole 35 of the flange 30 so as to position the footrest. After the positioning operation, the footrest 17 is pushed toward the vehicle body pane, and then the engagement pawl 29 of the clip 18 is engaged with the thread of the threaded stud to complete the operation for mounting the footrest 17 to the vehicle body panel. This mounting operation can be performed in a simple manner. FIG. 10(A) shows the state when the mounting operation has been completed. The footrest support 22 (or 23) is mounted to the vehicle body panel 41 by the clip 18 and the threaded stud 39. While the clip 18 is pre-attached to the footrest 17 in the above description, the pre-attaching operation is not essential.

As shown in FIG. 11(A), the mounted footrest 17 is used for placing the foot 11 of the driver or passenger thereon. FIG. 10(B) shows a state when the vehicle body panel 41 is deformed from the position shown by the double-dot chain line (or phantom line) to the position shown by the solid line (length =L) as shown by the arrow 42. This deformation acts to thrust up the threaded stud 39 fixed to the vehicle body panel 41 by the length (L) and thrust up the clip 18 attached to the stud by the length (L) to push the clip 18 further into the footrest support 22, 23. However, in the present invention, the protrusion 33 provided on the side surface of the shank of the clip is formed on the side surface of the shank with the strength which allows the protrusion to be shorn by the end face of the notch 26 of the support 22, 23 when an excessive shock force pushing the shank further into the footrest support is applied by a collision or other factor. Thus, each of the protrusions 33 is shorn and separated from the shank of the clip as shown by the arrow 43. As a result, the shank 27 of the clip is successively inserted further into the footrest support 22, 23. The resilient engagement portion 31 is separated from the engagement hole 25 by its resilience. This can eliminate the support force of the footrest support 22, 23 from the protrusion 33, and thereby the protrusion will never thrust up the footrest 17. FIG. 11(B) shows the relationship between the footrest 17 and the foot 11 of the driver or occupant when the vehicle body panel is deformed. Even if the vehicle body panel 41 is deformed from the position shown by the double-dot chain line to the position shown by the solid line, the clip 18 without the protrusions 33 is merely pushed further into the footrest support 22, 23, and the footrest 17 itself will not be thrust up. Thus, no load is applied to the foot 11 of the driver or occupant, and thereby the driver never be damaged at the point 13 as shown in FIG. 3. Further, in the present invention, since the footrest 17 is mounted on the vehicle body panel 41 by using the clip 18. Although the clip 18 has a damage of the protrusion 33 by the deformation of the vehicle body panel 41, the footrest 17 is not damaged. Thus, the footrest can be reused. Further, since any collision force causing the deformation of the panel can be adequately dealt only by setting the shearing load of the protrusion 33, the setting can be advantageously simplified.

FIG. 12 shows an alternative embodiment of the clip. This clip 45 is different from the aforementioned clip 18 only in the fixing portion to the vehicle body panel. Other portions are substantially the same as those of the clip 18, and the description for the other portions will be omitted. In the clip 45, an anchoring-leg engagement portion 47, which is formed in a shaft 46 of the clip on the vehicle body panel side, serves as the fixing portion. The anchoring-leg engagement portion 47 is inserted into and engaged with a mounting hole 49 formed in a vehicle body panel 41. In the clip 45, a protrusion 33 is formed on the side face of the shank 46 with a strength which allows the protrusion to be shorn by the end of a footrest support 22 when an excessive impact force pressing the shank 46 further into the footrest support is applied by a collision or other factor.

In general, the above identified embodiments are not to be construed as limiting the breadth of the present invention. It will be understood that modifications or other alternative constructions may become apparent within the scope of the invention as defined in the appended claims.

What is claimed is:

1. A footrest clip for mounting a footrest on a vehicle body panel, the footrest clip including a shank to be inserted into and fixed to a hollow tubular support extending from a rear surface of a step of said footrest, and a vehicle body panel fixing portion formed at a portion of said shank which is protruded out of an end of said support, comprising:

a protrusion for defining height of said footrest is provided at a side of an intermediate height region of said shank and is arranged to engage with the end of said support so as to prevent said shank from being further inserted; and said protrusion is formed on the side of said shank of predetermined strength whereby said protrusion to be sheared by the end of said support upon a vehicle collision of sufficient impact thereby causing said shank to be fully inserted into said support of said footrest, whereby, upon deformation of the vehicle body panel toward said step of said footrest, thrust applied to the step and directed to foot of a car driver is minimal.

2. The combination claimed in claim 1, wherein:

said shank includes an resilient engagement portion to be engaged with an engagement hole of said support when inserted into said support so as to prevent said shank from falling down from the support.

3. The combination claimed in claim 2, wherein:

a. said resilient engagement portion is releasably engaged in said engagement hole of said support; and b. said resilient engagement portion to be released from the engagement hole of said support upon a vehicle collision of sufficient impact to cause the shank to be inserted fully into said support.

4. The combination claimed in claim 3, wherein:

said shank portion protruded from the end of said support is hollow;

a rod-shaped stud extends upwardly from its connection to the vehicle body panel;

a thread is formed on the stud; and a resilient engagement pawl is formed on the vehicle body panel fixing portion to be engaged with said thread of said stud upon the stud being received in said hollow of the shank portion.

5. The combination claimed in claim 3, wherein:

said vehicle body panel fixing portion defines an anchoring-leg engagement portion to be inserted into and engaged with a mounting hole formed in said vehicle body panel.

6. A footrest assembly connected to a vehicle body panel comprising:

a footrest;

a clip connected to mount said footrest to the vehicle body panel;

a shank formed on said clip;

a hollow tubular support formed on the footrest and extending from rear surface thereof;

said shank is inserted into and affixed in said hollow tubular support;

a stud affixed to the vehicle body panel;

the clip is mounted to the stud;

a protrusion of predetermined strength formed on the upper end of the clip to limit insertion of the clip into the footrest and, upon vehicle collision of sufficient impact, the protrusion to be sheared to permit the clip to be fully inserted into the support of said footrest, whereby any thrust applied in the direction of a foot of the car driver upon deformation of the vehicle body panel toward said footrest will be minimal.

7. The combination claimed in claim 6, wherein:

said support of said footrest is formed with an engagement hole adapted to receive said shank of said clip therein; and said shank of said clip is formed with a resilient engagement portion to be releasably engaged with said engagement hole.

8. The combination claimed in claim 7, wherein:

said resilient engagement portion and said engagement hole of said support releasably engaged with each other whereby a sufficient impact will cause the disengagement.

9. The combination claimed in claim 8, wherein:

the stud is rod-shaped;

the stud has a side surface formed with a thread formed thereof;

said shank of said clip is hollow and will receive said stud therein; and a vehicle body panel fixing portion has a resilient engagement pawl adapted to be engaged with said thread of said stud upon its insertion into said hollow shank.

10. The combination claimed in claim 8, wherein:

said vehicle body panel is formed with a mounting hole, and said vehicle body panel fixing portion of said clip has an anchoring-leg engagement portion adapted to be inserted into and engaged with said mounting hole.

* * * * *